United States Patent

[11] 3,575,433

[72] Inventors Horst Beyer
 Burscheid;
 Hans Kling, Cologne-Lindenthal, Germany
[21] Appl. No. 791,968
[22] Filed Jan. 17, 1969
[45] Patented Apr. 20, 1971
[73] Assignee Goetzewerke Friedrick Goetze AG
 Burscheid, Germany
[32] Priority Jan. 20, 1968
[33] Germany
[31] P 16 75 300.7

[54] PISTON RING FOR AN INTERNAL-COMBUSTION ENGINE AND METHOD FOR MAKING SAME
14 Claims, 2 Drawing Figs.

[52] U.S. Cl. .................................................. 277/235,
 29/156.6
[51] Int. Cl. ..................................................... F16j 15/00
[50] Field of Search .......................................... 277/235
 (A), 235; 29/156.6; 219/121 (EB), 76, 77

[56] References Cited
UNITED STATES PATENTS

| | | | |
|---|---|---|---|
| 1,791,968 | 2/1931 | Morgan | 219/77 |
| 2,905,512 | 9/1959 | Anderson | 29/156.6 |
| 2,919,486 | 1/1960 | Banquarel | 29/156.6 |
| 3,283,120 | 11/1966 | Spruck | 219/121 |

FOREIGN PATENTS

| 632,986 | 12/1949 | Great Britain | 277/235 |
|---|---|---|---|

Primary Examiner—Milton Kaufman
Attorney—Spencer and Kaye

ABSTRACT: A piston ring has a bearing surface layer first mechanically applied thereto which is subsequently alloyed thereto by electron bombardment.

INVENTORS

Horst BEYER & Hans KLING

BY Spencer & Kaye

ATTORNEYS

PISTON RING FOR AN INTERNAL-COMBUSTION ENGINE AND METHOD FOR MAKING SAME

BACKGROUND OF THE INVENTION

The present invention relates to a piston ring, and, more particularly to a piston ring for an internal combustion engine, formed of a ferrous material, i.e. iron or steel and provided with a bearing surface layer and a method for making such a piston ring.

The continued advances in internal combustion engines increasingly demand piston ring materials with greater strength and toughness than that of conventional cast iron. Such stronger materials, as for example malleable cast iron, spheroidal graphite iron or steel have the drawback, however, of reduced wear or abrasion resistance. Alloying elements such as, for example, phosphorous, vanadium, molybdenum, chromium or titanium, can improve the abrasion resistance of materials but they cause the materials to become brittle and more likely to break, particularly when used in working elements with relatively small cross sections such as piston rings for automobile engines. The difficulties encountered in working such piston rings also increases their production costs.

A further disadvantage of the known piston rings also results from the so-called burn traces appearing on the bearing surfaces during operation. The danger of formation of the burn traces is less when the bearing surface is coated with a layer, for example, of molybdenum. Coatings of materials with high melting points reduce the danger of burn traces. However, such metals as tungsten, molybdenum, osmium or rhenium are very expensive in alloy concentrations of more than 50 percent, beside the fact that there exist no economically operating smelting furnaces in which the entire demand for these materials for piston rings could be melted. Extruded layers or galvanically deposited layers of these materials have the drawback that they exhibit only low layer toughness and can chip off under certain conditions of engine operation, which can lead to destruction of the engine.

SUMMARY OF THE INVENTION

The object of the present invention is to provide an improved, wear-resistant piston ring for an internal combustion engine without the drawbacks discussed above.

It is known to vapor deposit metallic layers in a vacuum by means of electron bombardment, for example by bringing a wire through a water-cooled nozzle into the path of an electron beam which wire has a temperature sufficiently high to cause evaporation. It is also known to wholly or partially harden the bearing surfaces of piston rings for internal combustion engines by means of thermally acting radiation energy. In contradistinction to such approaches, the present invention provides for the subsequent alloying of a bearing surface layer which is first anchored substantially only mechanically, for example by spraying, gluing or galvanic deposition and which is formed of chromium, chromium carbide, molybdenum, tungsten, tungsten carbide, boron carbide, titanium, aluminum oxide, silicon carbide, rhenium, osmium or nickel, to a layer thickness of up to several tenths of a millimeter of the surface with the basic material in that the layer is melted by means of an electron beam. Such beams are know, inter alia, as laser beams; devices for generating such beams are known, inter alia, as plasma burners.

DESCRIPTION OF THE PREFERRED EMBODIMENT AND METHOD

According to the present invention, a piston ring of the type described in the introductory paragraph is physically or mechanically provided with a layer on its bearing surface which is then substantially alloyed on such surface by means of electron bombardment. This method of application, whose details are not the object of the present invention per se, has the advantage that melting and alloying can be accomplished on a piston ring which is almost finished, since due to the higher energy density of the electron beam by far the largest portion of the ring cross section remains unchanged and thus retains its toughness and shape.

According to the present invention a piston ring can further be provided with a second bearing surface layer which is alloyed by electron bombardment onto the first bearing surface layer. This results in the advantage that both layers adhere better to the piston ring and the toughness of the ring is increased. Depending on the duration of the energy action and the selection of the acceleration voltage and beam currents, it is possible to provide that the material of the first bearing surface layer not only alloys strongly and to a sufficient thickness at its surface with the material of the second layer, but it also simultaneously alloys at its backside with the basic material of the piston ring. Any desired concentration gradient for the alloy layers can be achieved by appropriate selection of the energy conditions.

The bearing surface layer according to the present invention may be machined, particularly ground, in order to produce the required surface roughness. However, such treatment need extend only to a slight depth.

EXAMPLE 1

A piston ring of cast iron was provided in a known manner by galvanic deposition with a chromium bearing surface layer. The chromium layer was alloyed on the piston ring by means of an electron gun to a range of up to 0.5 mm. depth, the acceleration voltage having been 100 kv. and the beam currents about 2 milliamperes.

EXAMPLE 2

A piston ring of cast iron was coated in a known manner with molybdenum by means of a spray pistol. The molybdenum layer was alloyed into the surface of the basic material by means of an electron gun; the acceleration voltage being 40 kv. and the beam currents 15 milliamperes.

EXAMPLE 3

A piston ring of cast iron was provided with a chromium bearing surface layer in a known manner. A molybdenum layer was mechanically anchored onto the chromium layer by spraying on the molybdenum. The one-time bombardment with an electron gun was performed under the same conditions as in Examples 1 and 2 for strongly alloying the surface of the basic material with the chromium and simultaneously for strongly alloying the surface of the chromium layer with the molybdenum.

Figure 1:
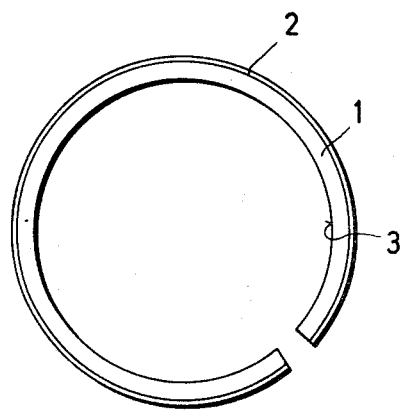
FIG. 1 is an elevational view of a piston ring showing a bearing surface layer which has been physically applied thereto.

Referring to the FIGS. and first to FIG. 1, this shows an elevational view of a piston ring 1 to which a bearing surface layer 2, formed of a material taken from the group of chromium, chromium carbide, molybdenum, tungsten, tungsten carbide, boron carbide, titanium, aluminum oxide, silicon carbide, rhenium, osmium and nickel, has been mechanically applied by, for example, spraying, gluing or galvanic deposition. The ring 1 has a central opening 3.

Figure 2:
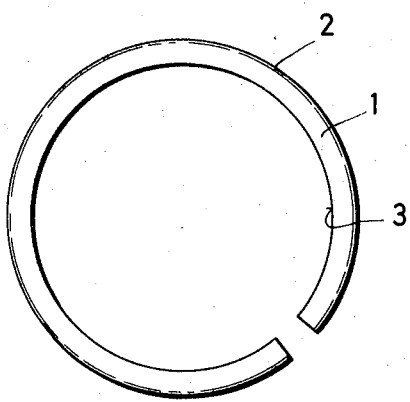
FIG. 2 is an elevational view of FIG. 1 after electron bombardment of the bearing surface layer.

Referring to FIG. 2, this shows the piston ring 1 of FIG. 1 after an electron beam bombardment of the bearing surface layer 2. As the legend accompanying FIG. 2 indicates, the mechanically applied layer 2 has been alloyed on the bearing surface of ring 1.

We claim:

1. A piston ring, particularly for internal-combustion engines, formed of a ferrous material and provided with a bearing surface layer which is substantially alloyed thereto by means of electron bombardment.

2. A piston ring as defined in claim 1 wherein said bearing surface layer is ground to produce the required surface roughness.

3. A piston ring as defined in claim 1 wherein a second bearing surface layer is alloyed to the first bearing surface layer by means of electron bombardment.

4. A piston ring as defined in claim 3 wherein said second bearing surface layer is ground to produce the required surface roughness.

5. A piston ring as defined in claim 1 wherein said bearing surface layer is formed of material taken from the group consisting of chromium, chromium carbide, molybdenum, tungsten, tungsten carbide, boron carbide, titanium, aluminum oxide, silicon carbide, rhenium, osmium and nickel.

6. Method of providing a bearing surface layer on a piston ring, formed of a ferrous material, for an internal combustion engine, comprising, in combination:
   a. mechanically applying a bearing surface layer to said piston ring;
   b. alloying the bearing surface layer to said ring by a bombardment of electrons.

7. Method of making a piston ring as defined in claim 6 comprising the further steps of mechanically applying a second bearing surface layer to the first bearing surface layer and alloying said second bearing surface layer to said first bearing surface layer by a bombardment of electrons.

8. Method of making a piston ring as defined in claim 7, the first of the bearing surface layers being chromium, the step of mechanically applying a second bearing surface layer including spraying molybdenum onto the chromium, the steps of alloying the chromium and the molybdenum being done in a one-time bombardment with electrons for strongly alloying the surface of the ferrous material with the chromium and simultaneously for strongly alloying the surface of the chromium with the molybdenum.

9. Method of making a piston ring as defined in claim 6 wherein said bearing surface layer is mechanically applied to said piston by spraying.

10. Method of making a piston ring as defined in claim 9, said bearing surface layer being molybdenum.

11. Method of making a piston ring as defined in claim 6 wherein said bearing surface layer is mechanically applied to said piston by galvanic deposition.

12. Method of making a piston ring as defined in claim 11 said bearing surface layer being chromium.

13. Method of making a piston ring as defined in claim 6 wherein said bearing surface layer is formed of a material taken from the group consisting of chromium, chromium carbide, molybdenum tungsten, tungsten carbide, boron carbide, titanium, aluminum oxide, silicon carbide, rhenium, osmium and nickel.

14. Method of making a piston as defined in claim 6 comprising further the step of grinding said bearing surface layer to required roughness.